Jan. 10, 1939.    A. R. HARVEY    2,143,654
GEAR SHIFT MECHANISM
Filed July 27, 1936    3 Sheets-Sheet 1
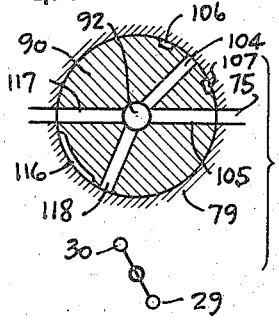
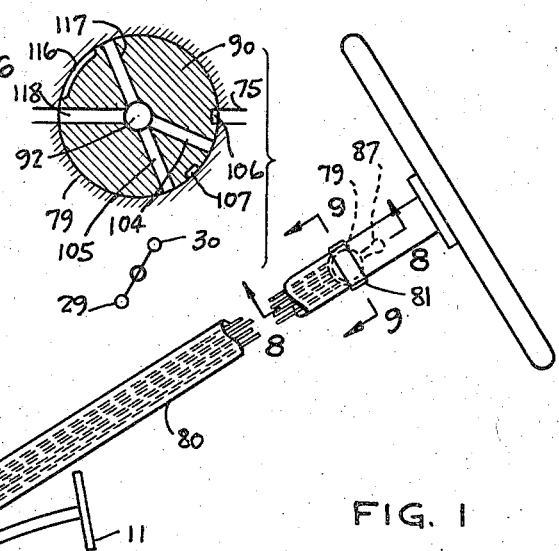
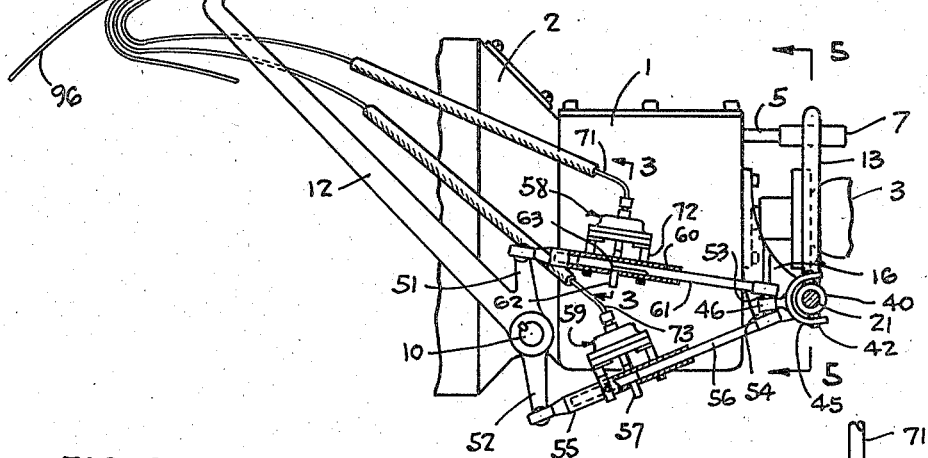
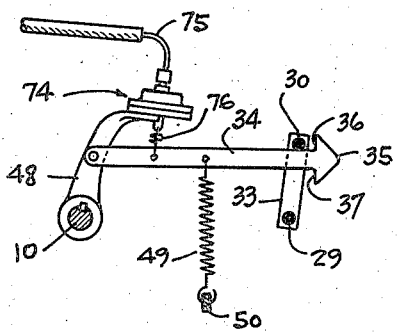
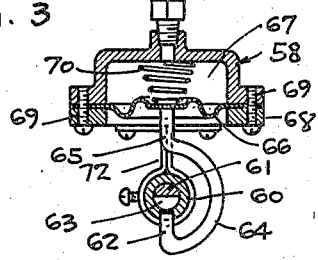
INVENTOR
Alfred Rey Harvey
BY *John Ham*
ATTORNEY Jan. 10, 1939.  A. R. HARVEY  2,143,654.
GEAR SHIFT MECHANISM
Filed July 27, 1936  3 Sheets-Sheet 2
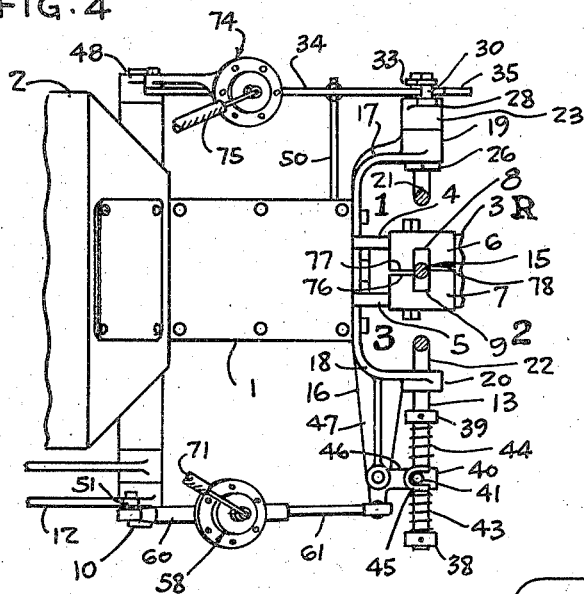
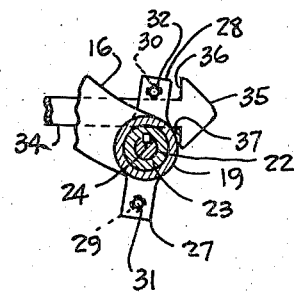
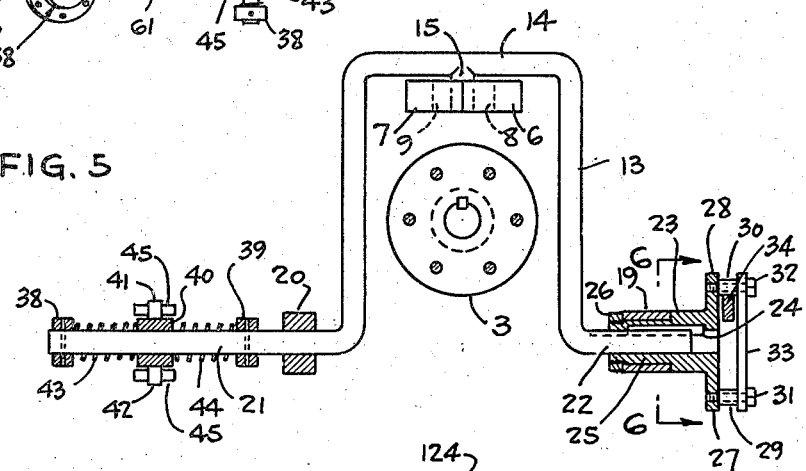
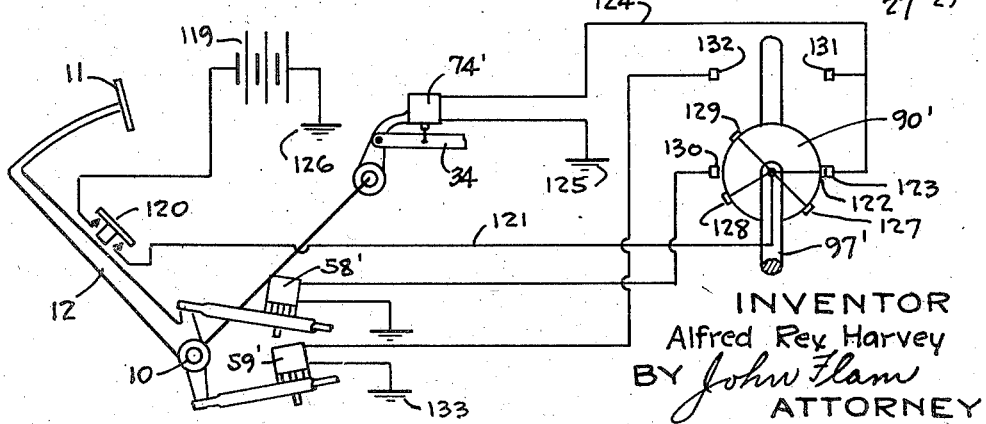
INVENTOR
Alfred Rey Harvey
BY John Flam
ATTORNEY

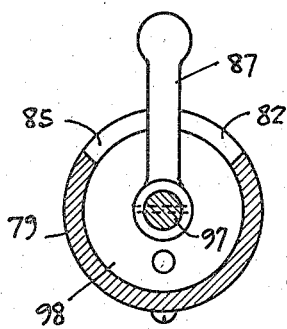
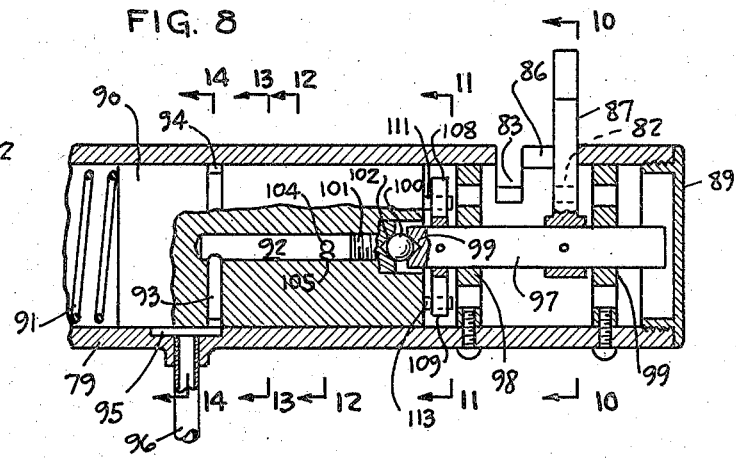
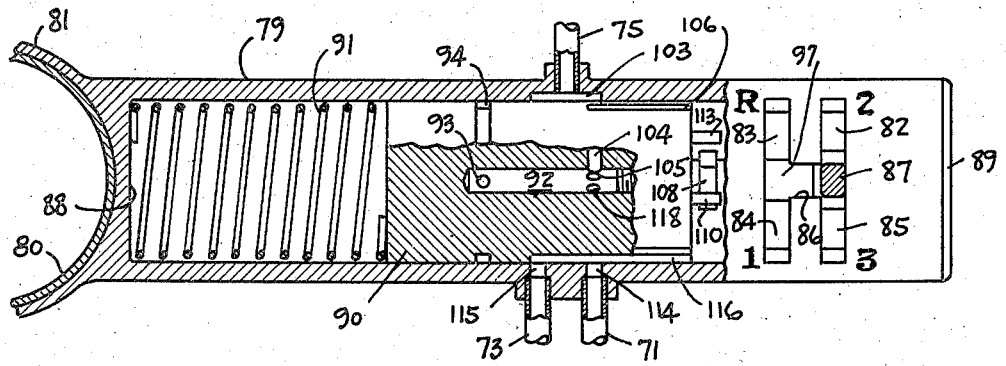
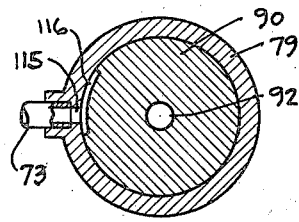
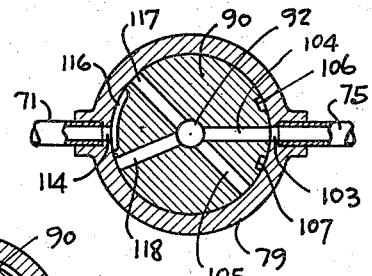
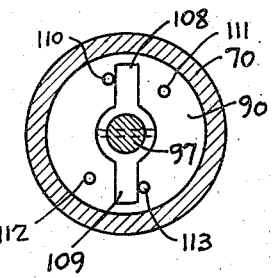
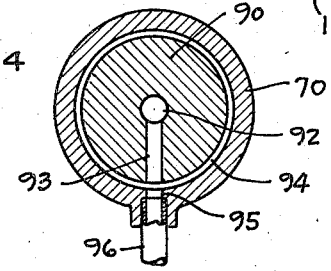

Patented Jan. 10, 1939

2,143,654

UNITED STATES PATENT OFFICE 2,143,654

GEAR SHIFT MECHANISM

Alfred Rex Harvey, Los Angeles, Calif.

Application July 27, 1936, Serial No. 92,726

27 Claims. (Cl. 74—334)

This invention relates to a mechanism for shifting the gears of a transmission such as are in common use in automobile engines, and is a continuation in part of an application filed June 3, 1935, in the name of Alfred Rex Harvey for Gear shift mechanism, Serial No. 24,673.

The almost universal type of gear ratio change mechanism between the engine and the propeller shaft of an automobile is one in which a pair of shift bars is used, and manipulated in an axial direction by a shift lever. The shift lever may be moved to engage either of the shift bars and the lever may then be moved to move the engaged bar either forward or backward. In "neutral" position, the lever is in a central position; this position maintains both bars inactive, and there is no driving connection from the engine to the propeller shaft. By the aid of an interlock within the transmission mechanism, the bars cannot be shifted until the shift lever is moved into full operative relation to one or the other of the bars.

With this preliminary summary of a common form of shift mechanism, it is now possible to outline the manner of shifting gears in common use. In order to permit the gear shift lever to be operated, the clutch must first be released by depressing the clutch pedal; then the shift lever is moved to the required position, and the clutch is then allowed to reengage.

It is one of the objects of this invention to simplify and improve in general on this form of mechanism.

Specifically, it is another object of this invention to make it possible to perform the gear shifting operation by operating the clutch pedal only, in cooperation with a presetting device that determines the shifted position of the transmission after the clutch pedal has been depressed and released.

It is still another object of this invention to provide a gear shift mechanism in which the desired operation of the mechanism is predetermined as by the setting of an air or vacuum valve or an electric switch; and then a manual operation of the clutch will result in the desired mode of operation of the shift mechanism. The presetting may be accomplished by vacuum operated devices connected to the intake manifold where such vacuum is available during operation of the engine; or by electromagnetic devices fed from the storage battery of the automobile.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of this invention is best defined by the appended claims.

Referring to the drawings:

Figure 1 is a side elevation partly in section, showing an embodiment of the invention as in an automobile, some of the parts of the automobile being diagrammatically illustrated;

Fig. 2 is a detail view, illustrating the mechanism for operating the shift member;

Fig. 3 is an enlarged sectional view, taken along plane 3—3 of Fig. 1;

Fig. 4 is a fragmentary top plan view of the apparatus shown in Fig. 1;

Fig. 5 is an enlarged sectional view taken along plane 5—5 of Fig. 1;

Fig. 6 is a detail sectional view, taken along plane 6—6 of Fig. 5;

Fig. 7 is a diagrammatic view of a modified form of the invention, in which electromagnetic devices are utilized for performing some of the operations of the system;

Fig. 8 is an enlarged sectional view, taken along plane 8—8 of Fig. 1, and illustrates the structure of the control valve;

Fig. 9 is an enlarged sectional view taken along plane 9—9 of Fig. 1;

Figs. 10, 11, 12, 13 and 14 are sectional views, taken respectively along planes 10—10, 11—11, 12—12, 13—13 and 14—14 of Fig. 8;

Fig. 15 is a diagram illustrating one phase of operation of the control valve; and Fig. 16 is a diagram similar to Fig. 15, illustrating another phase of operation of the valve.

In the present instance, the invention is illustrated as incorporated in a conventional type of automobile transmission mechanism 1, shown as attached to the rear end of the engine frame 2. This transmission mechanism 1 may be of the conventional type, in which gears are axially shifted in order to connect the transmission mechanism 1 between the engine and the propeller shaft 3. The various positions of the transmission mechanism 1 as commonly used, include a neutral position, in which the transmission mechanism is out of operative relation to the propeller shaft 3. The other positions of the transmission mechanism 1 include reverse, low speed, intermediate speed, and high speed.

The shifting of the gears is usually accomplished by the aid of a pair of shift bars 4 and 5. These bars are shown in Figs. 1, 4 and 5. They extend out of the transmission case and terminate in slotted dogs 6 and 7. The slots 8 and 9 in these dogs are so arranged that they are directed toward each other. They accommodate the operating portion of a shift member as will be hereinafter described. For the present it is sufficient to note that in neutral position, the slots 8 and 9 are aligned, as shown in Fig. 4, and the bars 4 and 5 are in an intermediate position with respect to them, and are adapted for longitudinal movements toward and from the transmission mechanism 1, as is well understood. The two shift bars 4 and 5 in this neutral position are interlocked so that it is impossible to move them as a unit in either direction.

In order to cause the transmission mechanism 1 to be placed in reverse position, the shift bar 4 must be moved toward the right as viewed in Fig. 4. For placing the transmission mechanism 1 in the low speed position, the shift bar 4 must be moved toward the left. During these operations the bar 5 is maintained in its intermediate position.

Similarly, in order to place the transmission 1 in second or intermediate position, the shift bar 5 must be moved to the right; and in order to place the transmission into high or third position, the shift bar 5 must be moved to the left. In this operation of shift bar 5, the shift bar 4 is maintained in the intermediate position.

In order to disclose the respective positions of these shift bars, the numerals 1, 2, 3 and the letter R are included in Fig. 4 at appropriate places to indicate the directional movement of the particular bar for securing any of these four positions.

In the conventional type of gear shift mechanism, the shifting of the bars 4 and 5 is accomplished by a gear shift lever, which is moved by the operator after he has disconnected the clutch interposed between the transmission mechanism 1 and the engine.

By the aid of the present invention, the gear shift lever is eliminated, and the shifting of the bars 4 and 5 is accomplishd selectively by operation of the clutch pedal 11, illustrated in Fig. 1. This clutch pedal is shown as having arm 12, keyed to the clutch shaft 10. The particular operation performed by depressing the clutch pedal 11 for disconnecting the clutch is predetermined by the operator, in a manner to be hereinafter described.

For this purpose, the mechanism for operating the bars 4 and 5 may include a yoke member 13, shown to best advantage in Fig. 5. This member 13 has a central yoke portion 14 extending above and across the bars 4 and 5, and having a central depending member 15 adapted to engage slot 8 or 9.

The yoke member 13 is mounted for transverse or axial movement so that the member 15 may pass from one slot into the other; and also for angular motion for correspondingly moving bars 4 and 5 longitudinally. For this purpose the yoke 13 is supported in a bracket 16 bolted to the rear end of the transmission mechanism 1. This bracket 16 is provided with the arms 17 and 18, carrying respectively the bearing bosses 19 and 20. The left hand end 21 of yoke 13 is accommodated in the boss 20 and is free to move axially therein as well as angularly.

The right hand end 22 of yoke 13 is splined in a bushing 23, disposed over the end 22, as by the aid of a spline 24 fixed in the bushing. This bushing is held against axial displacement with respect to bearing boss 19, and is journaled therein by the aid of its reduced portion 25. The extremity of the reduced portion 25 is threaded for the accommodation of lock nut 26, serving to restrain the bushing against axial movement. The end 22 of yoke 13 can thus move longitudinally within the bushing 23 without disturbing the driving connection between that bushing and the yoke 13.

The bushing 23 can be provided with oppositely directed radial arms 27 and 28. These arms in turn serve to support a pair of spaced sleeves 29 and 30, by the aid of bolts 31 and 32. Between the heads of the bolts 31 and 32, and the sleeves 29 and 30, a spaced plate 33 is supported to form a space for an actuating link 34 (Figs. 2, 5 and 6). This assembly may be conveniently termed an actuator. This actuating link is provided with an enlarged head 35 forming a pair of abrupt shoulders 36 and 37 capable of engaging the sleeves 30 and 29. It is apparent that when the link 34 is moved to the left as viewed in Figs. 2 and 6, the shoulder 36 may engage sleeve 30 and cause a counterclockwise rotation of the bushing 23, and therefore a corresponding counterclockwise rotation of yoke 13. Similarly if link 34 is moved to its lower position, the abrupt shoulder 37 cooperates with sleeve 29 and may cause a clockwise rotation of bushing 23, when the link 34 is moved to the left.

The counterclockwise rotation of bushing 23 causes the member 15 to move toward the left as viewed in Fig. 4; and similarly a clockwise rotation of bushing 23 causes the member 15 to move toward the right as viewed in Fig. 4. It is also apparent that this movement of yoke 13 may serve to actuate either one of the shift bars 4 and 5, depending upon the axial position of the yoke 13 in its bearing bosses 19 and 20.

The mechanism is so arranged that the yoke 13 may be axially and angularly moved in accordance with the desired gear shifting operation. The force exerted to move the yoke 13 axially and angularly is provided by depression of pedal 11 which serves to operate the yoke 13 immediately after the clutch disconnects the engine from the propelled mechanism. However, the selection of the direction of axial movement as well as the direction of angular movement is predetermined by the operator before the pedal 11 is depressed. The manner in which this is accomplished will be hereinafter described.

The axial movement of the yoke 13 is accomplished by the aid of mechanism most clearly illustrated in Figs. 4 and 5. In these figures it is seen that the extension 21 of yoke 13 is provided with a terminal collar 38 and an intermediate collar 39 spaced from the collar 38. Both of these collars are rigidly fastened to the extension 21. Intermediate the collars 38 and 39, there is a movable collar 40 having diametrically extending pins 41 and 42. Interposed between the slidable collar 40 and each of the fixed collars 38 and 39 is a compression spring 43 or 44, each under some initial compression. When the collar 40 is moved toward the right as viewed in Fig. 5, spring 44 will be compressed, and spring 43 will be permitted to expand. A resilient force will be created by this compression tending to urge the yoke 13 toward the right, or in an upward direction as viewed in Fig. 4. This force corresponds to the retention in or urging of member 15 into cooperative relation with slot 8 of bar 4. On the other hand, when collar 40 is moved toward the left as viewed in Fig. 5, spring 43 is compressed and spring 44 is allowed to expand. A resilient force will be created by this compression tending to urge yoke 13 to the left, or in a downward direction as viewed in Fig. 4. This corresponds to the retention in, or urging of member 15 in cooperative relation with slot 9 of shift bar 5.

These resilient forces can serve to shift the member 15 from one slot into the other only when these slots are in alignment; that is, when the shift bars 4 and 5 reach the neutral position illustrated in Fig. 4. When the slots 8 and 9 are out of alignment, the resilient force theretofore created by movement of collar 40 is ineffective until the yoke 13 is angularly rotated to align the slots 8 and 9.

When the axially movable collar 40 is left free, the springs 43 and 44 serve to create a centralizing force tending to hold yoke 13 in the intermediate position of Figs. 4 and 5, or to urge it to that position.

The collar 40 is adapted to be urged in one or the other direction by the aid of a clevis 45 formed on one arm of a bell crank lever 46. This bell crank lever is mounted for pivotal movement on the arm 47 shown as integral with the supporting bracket 16. The bell crank 46 is adapted to be rotated in one or the other direction when the clutch pedal 11 is depressed, depending upon which of two connecting means is rendered active, between the clutch arm 12 and the lever 46. Similarly, the direction of angular movement of yoke 13 is dependent upon the position of the link 34, also connected to be operated by depression of the clutch pedal 11. For this purpose the clutch shaft 10 extends from one side to the other of the clutch mechanism, and carries an arm 48 at its opposite end as viewed in Figs. 2 and 4. The link 34 is pivoted on the arm 48. A depression of pedal 11 will cause the link 34 to move toward the left as viewed in Fig. 2. Normally a tension spring 49 urges the link 34 to its lowermost position, to place the link in operative relationship with the lower sleeve 29, so as to cause a force to be exerted for urging the yoke 13 in a clockwise direction. The lower end of the spring 49 may be anchored on a stationary bar 50. The arrangement is such that the first part of movement of pedal 11 is free, the abrupt shoulders 36 and 37 being spaced from the sleeves 29 and 30 when the clutch is in engagement. This lost motion is required in order to permit the clutch to be disconnected before any shifting of gears may take place. Furthermore, means are provided for overcoming the force of spring 49 when desired, so as to move the link 34 upward to the position of Fig. 2, and thereby to place it into cooperative relation with the upper sleeve 30. In this way operation of clutch pedal 11 will create a force tending to rotate the yoke 13 in a counterclockwise direction.

Depression of pedal 11 may serve to rotate the bell crank lever 46 in either direction, or to leave it undisturbed. If the rotation of lever 46 be in a clockwise direction as viewed in Fig. 4, a force is created tending to urge the yoke 13 downwardly. Similarly, a rotation of lever 46 in a counterclockwise direction will create a force tending to urge the yoke 13 upwardly.

The mechanism for optionally choosing the direction of rotation of the lever 46 may now be described. The pedal arm 12 is provided with a pair of oppositely directed arms 51 and 52 (Fig. 1). Similarly, the bell crank lever 46 has an upper projection 53 and a lower projection 54. There is a link thrust rod connection between arm 52 and the lower projection 54 of the bell crank 46. The connection between the link and these arms is made universal, as by a ball and socket connection. The link connection is also made in two parts. For example, the part 55 of the link connected to the arm 52 is in the form of a hollow tube, adapted to telescope over the rod 56, jointed by a universal connection to the bell crank lever 46. It is apparent that if no other instrumentality be used, a counterclockwise rotation of clutch arm 12 will merely cause the tube 55 to telescope over the rod 56 and arm 46 is not actuated.

However, in order optionally to cause a thrust to be exerted from member 55 to member 56, use is made of a pin 57 adapted to be moved radially inwardly of the tube 55. When pin 57 moves upwardly, its end will act as an abutment against the inner end of rod 56. In this way movement of clutch arm 12 in a counterclockwise direction will cause a thrust to be exerted on rod 56 by the pin 57 to rotate bell crank lever 46 in a counterclockwise direction.

The radial position of pin 57 may be controlled in any appropriate manner as by an electromagnet, or by a pneumatically operated device, which is operated by the reduced air pressure in the intake manifold of the engine. The construction of the vacuum operated device is best seen in connection with Fig. 3, which illustrates the device 58 adapted to control the connection between arm 51 and crank 46. The vacuum operated device 59 controlling the connection between tube 55 and rod 56, is substantially identical with the device 58.

The connection from arm 51 to crank 46 also comprises a hollow tubular member 60 and a rod 61, joined respectively by a universal connection to arm 51 and crank 46. Elements 60 and 61 are in telescopic relation. As clutch arm 12 is depressed, the tubular member 60 will be pulled toward the left. This movement will not affect rod 61 unless a radial pin 62 (Figs. 1 and 3) be pulled upwardly so as to be in the path of a shoulder 63 in rod 61. When the pin 62 is pulled upwardly, the motion of tube 60 to the left will cause a corresponding motion of rod 61 to the left, and crank 46 will be rotated in a clockwise direction.

Pin 62, as shown most clearly in Fig. 3, is attached to an arcuate support 64 extending around the tubular member 60. At its upper end the support 64 is provided with an extension 65 radial to the tube 60. The upper end of the extension 65 is riveted or otherwise attached to the flexible corrugated diaphragm 66. This diaphragm closes in a fluid type manner the chamber 67 formed in the device 58. The fluid type connection can be secured as by the aid of a flange ring 68 engaging the edge of the diaphragm 66 and appropriately fastened to the device 58 as by a series of screws 69. A compression spring 70 inside of chamber 67 urges the diaphragm 66 downwardly. When there is no pressure differential between the outer and innner surfaces of diaphragm 66, the spring 70 serves to disconnect the pin 62, as shown in the position of Fig. 3. However, in case the chamber 67 be connected to the intake manifold of the engine as by the tubular connection 71, the pressure on the inner side of the diaphragm 66 is reduced, and the external air pressure urges this diaphragm inwardly. This inward motion of diaphragm 66 will cause the pin 62 to be pulled upwardly, and connection is thereby established between arm 51 and crank 46.

The device 58 may be appropriately supported as by straps 72 on the tubular member 60.

The vacuum operated device 59 controlling the connection between arm 52 and crank 46 is of identical construction with device 58. In device 59, the compression spring within its chamber, urges the pin 57 radially downwardly. When, however, there is a reduction in pressure inside the member 59 as by the aid of the connection 73 to the intake manifold of the engine, the atmospheric pressure overcomes the compression spring and urges the pin 57 inwardly for effecting the connection.

Either of the two devices 58 and 59 may be caused to operate prior to the time that the clutch is depressed. The particular device operated determines the direction of rotation of crank 46, and accordingly the direction of the resilient force applied to yoke 13.

The direction of angular motion of the yoke 13 is also controlled by the aid of a vacuum operated device 74 (Figs. 2 and 4). This vacuum operated device is similar in construction to the device 58 heretofore described. Instead of controlling a radial pin however, it exerts an upward force on the link 34 when the connection 75 is in communication with the intake manifold of the engine. The device 74 can be appropriately supported on the end of the lever arm 48 fastened to the clutch shaft 10. The connection to the link 34 is made by the aid of a tension spring 76. In the position shown in Fig. 2, the device 74 is under the influence of the intake manifold vacuum. The spring 49 is therefore under tension and has been overcome by the air pressure operating on the exposed surface of the diaphragm in device 74. In the position shown in Fig. 2, depression of the clutch pedal will cause a counterclockwise rotation of yoke 13. Should the connection between device 74 and the intake manifold be interrupted, the spring 49 would pull the link 34 downwardly and the direction of the force urging the yoke 13 angularly would be reversed.

Before describing how the vacuum operated devices 58, 59 and 74 may be controlled, a resume of the motions of the yoke 13 may be set forth.

For the position shown in Fig. 4, the yoke 13 is in neutral. The actuator 15 is central with respect to the slots 8 and 9 and therefore the yoke is locked against movement. Depression of the clutch pedal 11, with the devices 58 and 59 inactive, and device 74 active, all as shown, will therefore cause no shifting of gears and will serve only to disconnect the clutch. Similarly, with the device 74 inactive, as well as devices 58 and 59 inactive, depression of the clutch pedal will serve only to disconnect the clutch. For movement of the clutch pedal to be effective to shift the gears, either device 58 or device 59 must be active, and device 74 may be active or not, the particular combination depending on what gears it is desired to shift into operative relationship. The downward motion of pedal 11 is in this instant limited by the lost motion between link 34 and bushing 23. This lost motion, however, is sufficient to permit disconnection of the clutch.

Now if it be desired to shift the transmission into reverse, the yoke 13, as viewed in Fig. 4, must be moved upwardly, and thereafter this yoke must be rotated in a clockwise direction as viewed in Figs. 2 and 6. The upward motion of yoke 13 corresponds to a counterclockwise motion of crank 46. Accordingly, pin 57 must be placed in cooperative relation between the tube 55 and rod 56. This can be obtained by establishing the vacuum connection between the device 59 and the intake manifold of the engine. Furthermore, the link 34 must be in cooperative relation with the lower sleeve 29 in order to impart a clockwise rotational force with respect to the yoke. This is obtained by releasing the vacuum operated device 74 so as to permit spring 49 to move the link 34 downward. This predetermining of the directions of axial and angular motions by the control of the vacuum operated devices merely establishes the connections without actually causing any motion. Now when pedal 11 is depressed, spring 44 is compressed and serves to urge the yoke 13 upwardly to move the member 15 into slot 8 and out of slot 9. The first part of the motion of pedal 11 is ineffective so far as rotation of the yoke is concerned, but serves to disconnect the clutch. After the lost motion is taken up between the link 34 and the sleeve 29, the yoke 13 is rotated in a clockwise direction and the transmission is shifted to reverse position. Upon release of the clutch pedal 11, the crank 46 is returned to the intermediate position of Fig. 4. The member 15, however, is prevented from moving out of slot 8 because now the slots 8 and 9 are not in alignment. The spring 43 acts merely to urge the member 15 against the upper surface of the right hand portion of the slotted dog 7.

If it is now desired to shift the mechanism from reverse to first speed, the yoke 13 must be in its upper position, but the direction of rotation of yoke 13 must be reversed. Therefore, to preset for this operation, the vacuum devices 59 and 74 are operated. This causes the connection between tube 55 and rod 56 to be established and also causes the spring 49 to be overcome to bring the link 34 to the position of Fig. 2. Now upon depression of clutch pedal 11, the yoke 13 is maintained in its upper position, and after a short free movement of pedal 11, the link 34 cooperates with sleeve 30 to rotate the yoke 13 in a counterclockwise direction; and the gears are now shifted to first or low speed position.

Upon release of pedal 11, the crank 46 is again centralized, but now the member 15 is urged resiliently against the upper surface 76 of the left hand portion of the slotted dog 7. The yoke 13 is prevented from moving into neutral position because again, the slots 8 and 9 are not in alignment. The slot 8 has passed to the left of slot 9. Accordingly, the transmission stays in first position.

Now, in order to shift from the first or low speed position to the intermediate or second position, it is necessary for the yoke 13 to be moved downwardly, and that the yoke be rotated in a clockwise direction. In order to accomplish this result, the vacuum device 58 is operated to cause connection to be established between arm 51 and crank 46, so as to cause a rotation of crank 46 in a clockwise direction when the pedal clutch 11 is operated. Furthermore, the other two vacuum devices 59 and 74 are left disconnected from the intake manifold of the engine. This causes the link 34 to move downwardly into cooperative relation with the sleeve 29. Now upon the downward motion of pedal 11, first of all the spring 43 is compressed; then after the lost motion is taken up, the yoke 13 begins its clockwise rotation. As soon as this clockwise rotation is sufficient to align slots 8 and 9, the spring 43 moves the member 15 into slot 9. Continued clockwise rotation will then actuate the dog 7 toward the right to place the transmission into intermediate or second speed. In this position, the slots 8 and 9 are again out of alignment, the slot 9 having passed to the right of slot 8. Accordingly, when the pedal 11 is released, the member 15 is retained in slot 9, but is urged by spring 44 against the lower right hand surface 78 of dog 6.

In order to facilitate the motion of member 15 from slot 8 to slot 9, as the position of alignment is reached and passed, the left hand upper surface 76 of dog 7 is cut away so as to form a clearance with respect to the lower corresponding surface 77 of dog 6. In this way as soon as spring 43 is effective, member 15 is urged immediately downward and partly out of the slot 8. Similarly, the lower right hand surface 78 of dog 6 is cut away to facilitate the motion of member 15 upwardly into the slot 8, as the position of alignment is reached and passed.

Upon release of clutch pedal 11 after the transmission 1 has been placed in second speed, the crank 46 is returned to its intermediate position. Spring 44 is compressed, but the surface 78 being disposed above slot 9 prevents member 15 from passing out of this slot.

In order to shift the gear transmission from second or intermediate, to high or third speed, it is necessary that the yoke 13 be retained in its lower position and to rotate the yoke 13 in a counterclockwise direction. For this purpose the vacuum devices 58 and 74 are both rendered active, so as to bring the link 34 into the position of Fig. 2, and to establish the connection from arm 51 to crank 46. Then upon a depression of pedal 11 the crank 46 will be rotated in a clockwise direction, maintaining member 15 within slot 9, and then after a period of lost motion, the yoke 13 is rotated in a counterclockwise direction by link 34.

To pass from this high speed position back to intermediate position, it is apparent that the yoke 13 must be rotated in a clockwise direction and spring 43 must be stressed to maintain member 15 in slot 9. Accordingly, the vacuum device 58 must be actuated to connected arm 51 to crank 46 and the other two vacuum devices must be left unenergized. The spring 49 will then pull the link 34 downward. Upon depression of pedal 11 the crank 46 will be rotated in a clockwise direction and link 34 will coact with sleeve 29.

To pass from this intermediate position to low or first speed, the yoke 13 must be urged upwardly to place member 15 into slot 8, and then the yoke must be rotated in a counterclockwise direction. For this purpose, pneumatic devices 59 and 74 must be energized. Device 74 pulls the link 34 to the position of Fig. 2. Upon depression of pedal 11 the crank 46 will be rotated in a counterclockwise direction, tending to urge the yoke 13 upward. Thereafter, the yoke 13 is rotated in a counterclockwise direction. Intermediate the counterclockwise motion the slots 8 and 9 are in alignment and member 15 is urged into slot 8. Continuation of the counterclockwise rotation will move the dog 6 toward the left, placing the mechanism in low speed position.

To move from low speed position to reverse position, the only change necessary is to rotate the yoke 13 in a clockwise direction. This is done by energizing vacuum device 59 so as to impart a counterclockwise rotation to crank 46 when the pedal 11 is depressed; and the other two devices 58 and 74 are left deenergized. Spring 49 now moves link 34 downwardly to obtain the correct direction of rotation.

These operations in sequence from reverse through first, second and third, and back from third through second and first to reverse can be preset by appropriate predetermination of the directions of axial and angular movement of yoke 13. However, in case it be required to pass directly from first to third position or vice versa, or from reverse to second position or vice versa, without passing the intermediate step, it is necessary to depress the clutch pedal 11 twice; the first time to return the yoke 13 to the neutral position of Fig. 4, and the second time to move the member 15 in the right direction for the desired operation. This double operation is necessary in order to make it possible for member 15 to pass from one slot 8 or 9 into the other slot 9 or 8.

Thus to pass from first to third position, the devices 58 and 59 are left inactive, and yoke 13 must be rotated in a clockwise direction to align slots 8 and 9. This is done by deenergizing the vacuum device 74, causing the spring 49 to move link 34 downward. Upon depression of the pedal 11 the yoke 13 returns to the neutral position of Fig. 4, and is there locked by the dogs 6 and 7. After the pedal 11 has been released, it is then possible to shift to third position by energizing the devices 58 and 74, providing for a downward motion of yoke 13, and a counterclockwise rotation thereof.

Similarly, to pass from third to first, the yoke 13 must be returned in one operation to the neutral position of Fig. 4. This is accomplished by deenergizing vacuum devices 58 and 59 and rotating yoke 13 in a clockwise direction. This required a deenergization of vacuum device 74. Upon depression of pedal 11, the return to the neutral position of Fig. 4 is accomplished. In order that the succeeding depression of pedal 11 may shift the gears to first position, the vacuum devices 59 and 74 must be energized to provide an upward motion of yoke 13 and a counterclockwise rotation thereof.

Similar considerations apply when shifting from reverse position to second position, or from second position to reverse position. In shifting from reverse position to second position, it is necessary to rotate yoke 13 in a counterclockwise direction to align slots 8 and 9 for the first depression of pedal 11. For this purpose vacuum devices 58 and 59 are deenergized and vacuum device 74 is energized for presetting the mechanism to impart a counterclockwise rotation to yoke 13. In order to shift to second from this neutral position, the vacuum device 58 is energized and the other two vacuum devices are left deenergized. The member 15 will then be moved downwardly with the yoke 13, and the yoke 13 will be rotated in a clockwise direction.

The reverse shift, from second position to reverse, involves first a counterclockwise rotation of yoke 13. This is accomplished by deenergizing both vacuum devices 58 and 59 and energizing vacuum device 74. Upon operation of clutch pedal 11 the mechanism will be moved to the neutral position of Fig. 4. To shift from this neutral position to reverse, it is necessary to energize vacuum device 58 to urge the yoke 13 upwardly and to deenergize the other two devices. The spring 49 moves link 34 downwardly to impart a clockwise rotation to the yoke 13.

It is preferred that the control of the vacuum connections be so arranged that the motion of a small control lever or arm be similar to the motions of the conventional gear shift lever in order that the operator may profit by his past experience in connection with prior gear shifting mechanism of this character.

The mechanism for accomplishing this result is shown in Figs. 8 to 16, inclusive. This mechanism includes a tubular valve body 79. This valve body may be conveniently attached to the steering column 80 of the automobile as by the aid of a circular strap 81. The body 79 projects radially with respect to the column 80 for ready manipulation of the control device by the right hand of the driver. Thus adjacent the right hand end of the body 79, an H slot is provided, forming the four extensions 82, 83, 84 and 85, connected by cross slot 86. Operating in the slots 82 to 86, inclusive, is a control arm 87. The extremities of the slots may be marked as indicated to show the positions of the arm 87 corresponding to the desired gear positions. The arrangement is such that the presetting for reverse connection involves the movement of the arm 87 into the extremity of slot 83. To first position involves the movement of the arm 87 into extremity of slot 84. For second position the arm 87 is to be moved into the extremity of slot 82, and for third or high speed position the arm 87 is to be moved into the extremity of slot 85. These operations of setting the arm 87 properly predetermine the conditions of energization of the three pneumatically operated devices 58, 59 and 74, when the shifting is done in the ordinary sequence. When it is desired to shift from first to third, or vice-versa, or from reverse to second, or vice-versa, the arm 87 is first moved to be in alignment with intermediate slot 86; then after an operation of clutch pedal 11, the arm 87 is moved to the corresponding slot extremity.

The valve mechanism for obtaining these results will now be described.

The valve body 79 is hollow and is provided with an end wall 88. A cap 89 can be threaded into the right hand extremity of the body 79. A rotatable and axially movable valve plug 90 is enclosed in the body 79. It is however, urged continually toward the right, as by the aid of the compression spring 91 disposed between the wall 88 and the inner end of plug 90.

The valve plug 90 has various ports and passageways cooperating with ports and passageways in the body 79 to control the connection of the devices 58, 59 and 72 to the intake manifold, as controlled by the position of arm 87. Thus for example, the body 90 has a central passageway 92 connecting as by a radial passage 93 to the annular port 94. This annular port 94 is arranged to coact with the port 95 formed in the body 79. This port 95 has an axial length sufficient to maintain the annular port 94 in continual communication with it for either of the two axial positions of plug 90. To this port is connected a vacuum connection 96 leading to the intake manifold of the automobile engine. It is thus seen that the central passageway 92 is in continual communication with the source of reduced pressure, and may be hereinafter considered as the source of reduced pressure.

The plug 90 is arranged to be urged by the spring 91 against a post 97 to which is fastened the arm 87. This post 97 is supported for sliding and rotation in a pair of spiders 98 and 99 fastened inside of the body 79. The inner extremity of the post 97 is provided with a conical recess 99 adapted to seat a thrust ball 100. The plug 101 threaded into passageway 92 is provided with a similar conical seat 102 engaging the thrust ball 100.

The vacuum connection 75 leading to the vacuum device 74 is in communication with the port 103 in the body 79. This port 103 is also of sufficient axial extent so that it may establish communication with either of two radial ports 104 and 105 connecting to the passageway 92 (Fig. 12), for either axial position of plug 90. At times port 103 may also be in communication with either of the two exhaust ports 106 and 107 formed on the periphery of the plug 90, and connecting with the right hand end of body 79, which is open to the air through the various slots 82 to 86 inclusive.

In the present instance, a 90° rotation of post 97 is provided between its extreme positions from the extremity of any slot to the extremity of any opposite slot. However, this 90° rotation is not fully imparted to the plug 90 for a purpose to be hereinafter described. Instead, post 97 carries a pair of radial arms 108 and 109 which operate between spaced pairs of pins 110—111 and 112—113 fastened into the end of the plug 90.

The control of the device 74 can now be set forth. For the position of arm 87 as illustrated in Figs. 8, 9 and 10, that is, in the right hand extremity of slot 86, the plug 90 has been moved by the spring 91 to its extreme right hand position. Furthermore, the vacuum connection 96 communicates by way of ports 95, 94 and 93 with the central passageway 92, and thence to the radial passageways 104 and 105. One of these two passageways (passageway 104) is in communication with port 103, and accordingly there is an energization of the device 74. The arm 108 is in contact with pin 110 and arm 109 is in contact with pin 113. In this position the vacuum connections 71 and 73 are out of communication with devices 58 and 59. Instead, these devices 58 and 59 are vented by connections 71 and 73 to atmosphere. Thus, connections 71 and 73 connect respectively to ports 114 and 115 in body 79. These ports in this position are in communication with an air venting port 116 in the periphery of plug 90. However, rotation of plug 90 in one or the other direction will serve to align radial passage 117 or 118 with the connection 71. These radial passages 117 and 118 are in communication with the central passageway 92, so that for either direction of rotation the connection 71 will be connected to the source of vacuum. The two passageways 117 and 118 can be made to cooperate with the port 115 associated with connection 73 by moving the plug 90 to the left as by urging the arm 87 to the left in slot 87, then a rotation in one or the other direction will cause either one of the two passageways 117 and 118 to be placed in communication with the engine manifold connection 73.

As heretofore stated, for the position illustrated in Figs. 8 to 14, the device 74 is energized to place the link 34 in its uppermost position. This energization can be traced as follows: from connection 96 to port 95, annular port 94, radial port 95, central passageway 92, radial passageway 104, port 103, connection 75, to device 74. Operation of clutch pedal 11 for this setting would serve to rotate yoke 13 in a counterclockwise direction unless it had already been moved in a counterclockwise direction. When the slots 8 and 9 of dogs 6 and 7 align in this motion, the member 15 will assume the neutral position of Fig. 4.

In order to pass from this neutral position for example to reverse, the arm 87 is moved to the left and is then moved to the extremity of slot 83. This causes a corresponding motion of plug 90 to the left and a clockwise rotation of this plug. This clockwise rotation in the present instance is less than the 45° of motion of the arm 87, due to the lost motion connection provided between arms 108 and 109, and the pins 111 and 112. However, it is sufficient to align the radial passageway 118 with the port 115 and with connection 73. The rotation is also sufficient to bring the vent passageway 107 into alignment with the connection 75. This corresponds to energization of device 59 and deenergization of the other two devices.

In this position vacuum device 59 establishes the connection between arm 52 and crank 46, so as to urge the yoke 13 upwardly when pedal 11 is depressed. Furthermore, spring 49 has moved link 34 downwardly and accordingly a clockwise rotation of yoke 13 is effected to bring the transmission to reverse position.

In order to shift to first or low speed from reverse position, the arm 87 is rotated in a counterclockwise direction to bring this arm in the extremity of slot 84. This 90° movement of arm 87 causes less than a 90° movement of plug 90, because of the lost motion between arms 108 and 109, and pins 110 and 113. However, it is sufficient to bring port 105 into register with connection 75, causing device 74 to be energized. It is also sufficient to bring radial port 117 into an alignment with connection 73, thereby energizing vacuum device 59. This corresponds to a force urging the yoke 13 upwardly, and a rotational force in a counterclockwise direction to move the dog 6 to the left as viewed in Fig. 4. The position of the plug 90 in this condition is illustrated in Fig. 15; and the position of the sleeves 29 and 30 is also indicated.

Now in order to shift to second or intermediate position, the arm 87 is moved from the extremity of slot 84 to the extremity of slot 82. This corresponds to a 90° clockwise rotation of post 97, but a reduced clockwise rotation of plug 90. The plug 90 is moved to the position illustrated in Fig. 16. The plug 90 has also been moved to the extreme right hand position. The rotation has been sufficient to align radial port 118 with connection 71, energizing device 58. At the same time the vent port 116 has passed port 115 to vent device 59, and vent port 106 is in communication with connection 75, deenergizing device 74. In this position therefore, only device 58 is energized. Accordingly, the spring 49 has moved the link 34 downwardly in order to impart a clockwise rotation to yoke 13; and crank 46 has been moved in a clockwise direction to urge yoke 13 downward. At an intermediate point in the clockwise rotation, member 15 drops into slot 9 and continuation of the clockwise rotation places the mechanism into second gear.

To shift from second to high position, the arm 87 is moved through an arc of 90° from the extremity of slot 82 to the extremity of slot 85. This produces a counterclockwise rotation of plug 90 of less than 90° due to the lost motion between arms 108 and 109, and pins 110 and 113. The position of plug 90 is that illustrated in Fig. 15. The radial port 117 is in communication with connection 71, thereby energizing the device 58. The radial port 105 is in communication with connection 75 and therefore device 74 is also energized. In this motion, however, the device 59 has been vented to atmosphere by the passage of the vent port 116 past the port 115. In this position the link 34 is lifted upwardly to cause a counterclockwise rotation of yoke 13, and crank 46 is set for a clockwise rotation for urging the yoke 13 downwardly to hold member 15 in slot 9.

A reversal of the sequence from high to intermediate to low and to reverse can now be set forth.

Assuming that the arm 87 is in the extremity of slot 85, the plug 90 being in the position of Fig. 15, in order to place the transmission into second gear, the arm 87 is moved to the extremity of slot 82. This causes a 90° rotation of post 97, but due to the lost motion connection between arms 108 and 109, and pins 111 and 112, the plug 90 is rotated by less than 90° to the position of Fig. 16. In this position radial port 118 is in communication with connection 71, device 58 being energized. The vent port 116 has passed the port 115 ensuring inactivity of device 59. The radial passageways 104 and 105 have passed port 103 which is now in communication with vent port 106. Accordingly, only device 58 is active. When pedal 11 is depressed, the crank 46 is rotated in a clockwise direction, causing the yoke 13 to be urged downwardly in slot 9, and the yoke 13 is rotated in a clockwise direction by link 34.

To pass from intermediate to first position, the arm 87 is moved back to position of Fig. 9, and then to the left, and then moved to the extremity of slot 84. This produces a 90° rotation of post 97 in a counterclockwise direction, bringing the ports and passageways again into the position of Fig. 15. Passageway 117 is in communication with connection 73 and passageway 105 is in communication with connection 75. Therefore, devices 59 and 74 are energized and device 58 is deenergized. Upon depression of pedal 11 the crank 46 is rotated in a counterclockwise direction, urging the yoke 13 upwardly, and the link 34 being in the position of Fig. 2 will rotate the yoke in a counterclockwise direction. This places the transmission in first position.

To shift the transmission to reverse position, the arm 87 is moved through an angle of 90° from the extremity of slot 84 to the extremity of slot 83. This returns the plug 90 to the angular position of Fig. 16. The passage 118 is in communication with connection 73 and connection 75 is vented through the vent opening 106. The only active vacuum device is device 59. When the pedal 11 is depressed, the crank 46 is rotated in a counter-clockwise direction, causing yoke 13 to be urged upwardly in slot 9. The spring 49 pulls link 34 downwardly, and therefore the rotation of yoke 13 is in a clockwise direction.

In order to return the mechanism to the neutral position of Fig. 4 from either extreme annular positions of Figs. 15 and 16, the arm 87 must be moved to be in alignment with slot 86. Let it be assumed that the plug 90 is in the angular position of Fig. 15, corresponding to the position of arm 87 in the extremity of either slot 84 or 85. This corresponds to either first or third position, depending upon the axial position of plug 90. In order to return the mechanism to the neutral position of Fig. 4, it is apparent that the yoke 13 must be rotated in a clockwise direction. This corresponds to a deenergization of all three of the vacuum devices 58, 59 and 74. The arm 87 is rotated through 45°, but the plug 90 has been rotated only through an angle less than 45° by virtue of the lost motion between arms 108 and 109, and pins 111 and 112. In this position therefore, the vent 107 is in alignment with connection 75. Radial passageway 118 has not moved sufficiently to be in alignment with either ports 115 or 116. The radial port 117 has moved out of alignment with port 114 or 115. Therefore, all of the three devices 58, 59 and 74 are deenergized, and upon depression of the pedal 11 the yoke 13 is moved in a clockwise direction to return the shift dog 6 or 7 to the neutral position.

Now let it be assumed that it is desired to shift the mechanism from second or reverse position to neutral. In the second or reverse position the plug 90 has the angular position illustrated in Fig. 16. A 45° rotation of arm 87 to bring it within the slot 86 will impart a counterclockwise rotation to plug 90, which is less than 45° by virtue of the lost motion between arms 108 and 109, and pins 110 and 113. Thus, the radial passageway 105 is in communication with the connection 75 and device 74 is energized. The other two devices 58 and 59 are left unenergized because radial port 118 has moved out of alignment with its corresponding body port, and radial port 117 has not yet moved into alignment with the corresponding port. Accordingly, the condition of the apparatus is as illustrated in Fig. 2, the link 34 being in position to rotate the yoke 13 in a counterclockwise direction. Therefore, when pedal 11 is depressed, the yoke is rotated in a counterclockwise direction, and the member 15 moves out of the slot 8 or 9 in which it has been accommodated to the central position of Fig. 4.

It is not essential to operate the devices for determining the direction and extent of the axial and angular movements of yoke 13 by pneumatic means. In Fig. 7 a system is indicated in which the electromagnets 59', 58' and 74' are substituted for the respective pneumatic devices 58, 59 and 74. These electromagnetic devices can be in the form of solenoids with cores adapted to move pins 57, 62 and link 34. The source of power may be the battery 119 usually provided for the ignition system of the automobile. The post 97' corresponding to post 97 is adapted to operate a switch drum 90'. The post 97' can have the same type of lost motion connection and has two axial positions, corresponding to the lost motion connection and axial position of plug 90. In the position shown in Fig. 7, device 74' only is energized, corresponding to the condition of the apparatus illustrated in Figs. 1, 2 and 4. This energization can be traced as follows: from battery 119 through a switch 120, connection 121, contacts 122 and 123, connection 124, device 74', ground 125 and ground 126, back to battery 119. The switch 120 is a masterswitch denergizing all of the circuits while the clutch pedal 11 is in its active position. As soon as clutch pedal 11 is depressed, the switch 120 operates to energize the predetermined circuits. In this way it is assured that there will be no drain on battery 119 unless clutch pedal 11 is depressed.

It is apparent that contacts and electrical connectors correspond in Fig. 7 to ports and connections in the form of Fig. 1. Thus, the battery lead 121 may correspond to the connection to the intake manifold, and leads to the four spaced contacts 122, 127, 128 and 129 have respectively the same angular positions as the passageways 104, 105, 118 and 117. The stationary contacts 123 and 130 correspond to ports 103 and 114. The drum 90', when moved axially inward in the manner that plug 90 was moved in the first form, is arranged to cooperate with the stationary contacts 131 and 132 corresponding in spacing to the ports 103 and 115 respectively.

Assuming that the drum 90' is rotated through a lost motion connection of the same character as illustrated in the first form described, it is apparent that the electric current takes the place of the pneumatic effects produced in the first form. The particular position illustrated in Fig. 7 has already been described as corresponding to an energization of electromagnet 74', and deenergization of the other two magnets 58' and 59'.

In order to move the transmission to reverse position, electromagnet 59' only is to be energized. This is accomplished by moving the drum 90' axially inwardly and rotating the drum in a clockwise direction until contact 128 is in contact with stationary contact 132. The circuit for electromagnet 58' is then completed through the switch 120, connection 121, contacts 128 and 132, and ground connections 133 and 126. All other circuits are deenergized.

To move to first position, electromagnets 59' and 74' must both be energized and electromagnet 58' deenergized. For this position the drum 90' is rotated in a counterclockwise direction to bring contact 129 into engagement with stationary contact 132, and contact 127 is in contact with stationary contact 131. All other circuits are interrupted.

To bring the transmission to second gear, the drum 90' is permitted to move forward to the position indicated in Fig. 7, and the drum is rotated to bring contact 128 into engagement with contact 130. All other contacts are open. This causes energization of the electromagnet 58'.

To bring the transmission to high speed position, the drum 90' is rotated to place contact 129 into engagement with contact 130, and contact 127 into engagement with contact 123. In this position both electromagnets 58' and 74' are energized and the other magnet 58' is deenergized.

The reverse sequence is obvious from the foregoing. The manner of bringing the mechanism into neutral by virtue of the lost motion connection is similar to that already described. To bring the mechanism to neutral from either first or third position corresponding to the engagement of contact 129 with either 120 or 132, the drum 90' is rotated in a clockwise direction by an angle less than 45° which will interrupt all circuits and will place link 34' in such a position as to rotate yoke 13 in a clockwise direction for returning the mechanism to neutral.

On the other hand, should it be desired to bring the mechanism to neutral from either reverse or second position, the magnet 74' must be energized and all others deenergized in order to rotate the yoke 13 in a counterclockwise direction. In second or reverse position contact 128 is the active contact, and contact 122 is out of contact with the corresponding stationary contacts 123 or 131. Upon rotation of the drum 90' by an angle corresponding to 45° less the lost motion, the drum 90' is brought to the position of Fig. 7, in which electromagnet 74' only is energized.

From the foregoing description, it is apparent that the predetermining of the gear shift operation which is to take place when the clutch pedal 11 is depressed is a simple and easy matter. If it is not desired to shift the gears but only to disconnect the clutch, the control mechanism is left undisturbed. In that condition the elements tending to move yoke 13 merely have lost motions, and do not disturb the setting of the yoke 13.

What is claimed is:

1. In a transmission mechanism the ratio of which is variable, and having a clutch for connecting the transmission to a source of power, and control mechanism for the clutch, as well as a pair of shiftable bars capable of being moved in either direction from a neutral position for adjusting the ratio, a shift member capable of cooperating with either bar, an actuator for moving the shift member optionally in either direction to cause the selected bar to be moved to any of its three positions, connections between the shift member and the clutch control mechanism, and between the actuator and the clutch control mechanism, for causing the shift member and the actuator to be operated when the clutch control mechanism is moved in clutch releasing direction, the connection between the shift member and the clutch control mechanism including a member operated by the clutch control mechanism to impress an operating force upon the shift member continuously after initial motion of the clutch control mechanism in clutch releasing direction, and selector means operating on the connections to predetermine the direction and amount of movement of the actuator, and to predetermine the bar to be operated.

2. In a transmission mechanism the ratio of which is variable in a step-by-step manner, and having a clutch for connecting the transmission to a source of power, and clutch control mechanism, as well as a pair of shiftable bars capable of being moved in either direction from a neutral position for adjusting the ratio, and means for causing the motion of the clutch control mechanism in clutch releasing direction to cause either of the bars to assume a definite position, corresponding to a step from the previous position, comprising a shift member movable to cooperative relation with either bar, resilient means normally maintaining the shift member in intermediate position with respect to the bars, and means operative in response to movement of the clutch control mechanism in clutch releasing direction to cause the resilient means to urge the shift member continuously toward cooperative relation optionally with either of the bars, after initial motion of said clutch control mechanism.

3. In a transmission mechanism the ratio of which is variable in a step-by-step manner, and having a clutch for connecting the transmission to a source of power, and clutch control mechanism, as well as a pair of shiftable bars capable of being moved in either direction from a neutral position for adjusting the ratio, and means for causing the motion of the clutch control mechanism in clutch releasing direction to cause either of the bars to assume a definite position, corresponding to a step from the previous position, comprising a shift member movable to cooperative relation with either bar, resilient means normally maintaining the shift member in intermediate position with respect to the bars, means operative in response to movement of the clutch control mechanism in clutch releasing direction to cause the resilient means continuously to urge the shift member toward cooperative relation optionally with either of the bars after initial movement of the clutch control mechanism, means connected to the clutch control mechanism to move the shift member in a bar moving path, and means for selecting the direction of motion of the shift member in said path.

4. In a transmission mechanism the ratio of which is variable in a step-by-step manner, and having a clutch for connecting the transmission to a source of power, and clutch control mechanism, as well as a pair of shiftable bars capable of being moved in either direction from a neutral position for adjusting the ratio, and means for causing the motion of the clutch control mechanism in clutch releasing direction to cause either of the bars to assume a definite position, corresponding to a step from the previous position, comprising a shift member movable to cooperative relation with either bar, and vacuum operated means for predetermining the motion of the shift member in response to said motion, said vacuum operated means including an expansible chamber and means movable in response to variations in vacuum conditions in said chamber to form a mechanical connection between the shift member and the clutch control mechanism.

5. In a transmission mechanism the ratio of which is variable in a step-by-step manner, and having a clutch for connecting the transmission to a source of power, and clutch control mechanism, as well as a pair of shiftable bars capable of being moved in either direction from a neutral position for adjusting the ratio, and means for causing the motion of the clutch control mechanism in clutch releasing direction to cause either of the bars to assume a definite position, corresponding to a step from the previous position, comprising a shift member movable to cooperative relation with either bar, and electro-magnetically operated means including means movable in response to variations of current in the electro-magnet to form a mechanical connection between the shift member and the clutch control mechanism.

6. In a transmission mechanism the ratio of which is variable in a step-by-step manner, and having a clutch for connecting the transmission to a source of power, and clutch control mechanism, as well as a pair of shiftable bars capable of being moved in either direction from a neutral position for adjusting the ratio, and means for causing the motion of the clutch control mechanism in clutch releasing direction to cause either of the bars to assume a definite position, corresponding to a step from the previous position, comprising a shift member having provisions for axial and angular movement, the axial position thereof being determinative of the bar to be moved thereby, or whether the member be retained in a neutral position intermediate the bars, and the direction and extent of angular movement determining the position that the selected bar is to attain, resilient means for normally urging the shift member to said intermediate position, a lever having an arm engaging said resilient means which may cause the resilient means to urge the shift member selectively in either direction from its intermediate position, a pair of releasable connections between the lever and the clutch control mechanism, for respectively moving the lever and arm to cause the resilient means to urge the shift member in one or the other direction, and means for optionally establishing either connection.

7. In a transmission mechanism the ratio of which is variable in a step-by-step manner, and having a clutch for connecting the transmission to a source of power, and clutch control mechanism as well as a pair of shiftable bars capable of being moved in either direction from a neutral position for adjusting the ratio, and means for causing the motion of the clutch control mechanism in clutch releasing direction to cause either of the bars to assume a definite position, corresponding to a step from the previous position, comprising a shift member having provisions for axial and angular movement, the axial position thereof being determinative of the bar to be moved thereby, or whether the member be retained in a neutral position intermediate the bars, and the direction and extent of angular movement determining the position that the selected bar is to attain, resilient means for normally urging the shift member to said intermediate position, a lever having an arm engaging said resilient means which may cause the resilient means to urge the shift member selectively in either direction from its intermediate position, a pair of releasable connections between the lever and the clutch control mechanism, for respectively moving the lever and arm to cause the resilient means to urge the shift member in one or the other direction, and a pair of vacuum operated means optionally energized for optionally establishing either connection.

8. In a transmission mechanism the ratio of which is variable in a step-by-step manner, and having a clutch for connecting the transmission to a source of power, and clutch control mechanism, as well as a pair of shiftable bars capable of being moved in either direction from a neutral position for adjusting the ratio, and means for causing the motion of the clutch control mechanism in clutch releasing direction to cause either of the bars to assume a definite position, corresponding to a step from the previous position, comprising a shift member having provisions for axial and angular movement, the axial position thereof being determinative of the bar to be moved thereby, or whether the member be retained in a neutral position intermediate the bars, and the direction and extent of angular movement determining the position that the selected bar is to attain, resilient means for normally urging the shift member to said intermediate position, a lever having an arm engaging said resilient means which may cause the resilient means to urge the shift member selectively in either direction from its intermediate position, a pair of releasable connections between the lever and the clutch control mechanism, for respectively moving the lever and arm to cause the resilient means to urge the shift member in one or the other direction, and a pair of electromagnets optionally energized for optionally establishing either connection.

9. In a transmission mechanism the ratio of which is variable in a step-by-step manner, and having a clutch for connecting the transmission to a source of power, and clutch control mechanism, as well as a pair of shiftable bars capable of being moved in either direction from a neutral position for adjusting the ratio, and means for causing the motion of the clutch control mechanism in clutch releasing direction to cause either of the bars to assume a definite position, corresponding to a step from the previous position, comprising a shift member having provisions for axial and angular movement, the axial position thereof being determinative of the bar to be moved thereby, or whether the member be retained in a neutral position intermediate the bars, and the direction and extent of angular movement determining the position that the selected bar is to attain, resilient means for normally urging the shift member to said intermediate position, a lever having an arm engaging said resilient means which may cause the resilient means to urge the shift member selectively in either direction from its intermediate position, a pair of releasable connections between the lever and the clutch control mechanism, for respectively moving the lever and arm to cause the resilient means to urge the shift member in one or the other direction, means for optionally establishing either connection, and a reversible connection between the shift member and the clutch mechanism for transmitting a rotative force to the shift member.

10. In a transmission mechanism the ratio of which is variable in a step-by-step manner, and having a clutch for connecting the transmission to a source of power, and clutch control mechanism, as well as a pair of shiftable bars capable of being moved in either direction from a neutral position for adjusting the ratio, and means for causing the motion of the clutch control mechanism in clutch releasing direction to cause either of the bars to assume a definite position, corresponding to a step from the previous position, comprising a shift member having provisions for axial and angular movement, the axial position thereof being determinative of the bar to be moved thereby, or whether the member be retained in a neutral position intermediate the bars, and the direction and extent of angular movement determining the position that the selected bar is to attain, resilient means for normally urging the shift member to said intermediate position, a lever having an arm engaging said resilient means which may cause the resilient means to urge the shift member selectively in either direction from its intermediate position, a pair of releasable connections between the lever and the clutch control mechanism, for respectively moving the lever and arm to cause the resilient means to urge the shift member in one or the other direction, a reversible connection between the shift member and the clutch mechanism for transmitting a rotative force to the shift member, and a common selector means for predetermining the movement of the lever arm and the direction of the force exerted by the reversible mechanism.

11. In a transmission mechanism the ratio of which is variable in a step-by-step manner, and having a clutch for connecting the transmission to a source of power and clutch control mechanism, as well as a pair of shiftable bars capable of being moved in either direction from a neutral position for adjusting the ratio, and means for causing the motion of the clutch control mechanism in clutch releasing direction to cause either of the bars to assume a definite position, corresponding to a step from the previous position, comprising a shift member movable to cooperative relation with either bar, resilient means interposed between the clutch control mechanism and the shift member and selective to urge the shift member to cooperative position with either bar, or toward an intermediate position, a reversible connection for exerting a force to move the shift member to operate the selected bar, and a single selector member for selecting the direction of the resilient force and the reversible connection, by moving said selector to any one of a number of optional positions corresponding to the desired setting of the transmission.

12. The combination as set forth in claim 1, with the provision of means in the connections between the shift member and the clutch control mechanism for creating a resilient force by the motion of the clutch control mechanism toward clutch releasing position tending to operate the shift member, and the provision of a lost motion in the connections between the actuator and the clutch control mechanism, whereby said resilient force is first created before the actuator is moved.

13. The combination as set forth in claim 1, in which means are provided in connection with the selector means, for optionally moving the shift member and actuator to a neutral position from any of the ratio setting positions.

14. In a transmission mechanism the ratio of which is variable and having a clutch for connecting the transmission to a source of power, and clutch control mechanism, as well as a pair of shiftable bars capable of being moved in either direction from a neutral position for adjusting the ratio, a shift member, a device for operating the shift member to select the bar to be moved thereby, said device including means capable of forming a mechanical connection between the clutch control mechanism and the shift member, as well as means for selectively forming the mechanical connection so as to cause the clutch control mechanism, upon motion in clutch releasing direction, mechanically to operate said shift member in the selected direction, said device also including a member movable to exert a force continuously in the selected direction upon the shift member after initial movement of the clutch control mechanism, an actuator for operating the shift member to move the selected bar, and a device for operating the actuator, said device including means capable of forming a positive mechanical connection between the clutch control mechanism and the actuator, as well as means for forming the mechanical connection so as to cause the clutch control mechanism, upon motion in clutch releasing direction, positively to operate said actuator in the chosen direction.

15. In a transmission mechanism the ratio of which is variable in a step-by-step manner, and having a clutch for connecting the transmission to a source of power, and clutch control mechanism as well as a pair of shiftable bars capable of being moved in either direction from a neutral position for adjusting the ratio, and means for causing the motion of the clutch control mechanism in clutch releasing direction to cause either of the bars to assume a definite position, corresponding to a step from the previous position, comprising a shift member movable to cooperative relation with either bar, means connected to the clutch control mechanism adapted to move the shift member into operative relation with either bar, said means including a pair of link mechanisms, either of said mechanisms being capable of forming optionally a mechanical connection between the shift member and the clutch control mechanism, to move the shift member in one or the other direction to optionally engage either bar, said means being arranged to urge the shift member continuously toward engaging relation with the selected bar after initial movement of the clutch control mechanism in clutch releasing direction, and means for predetermining which of said link mechanisms shall form a connection.

16. In a variable speed mechanism provided with a clutch, clutch control mechanism and variable speed gearing, said gearing having a pair of axially movable shifter bars, each having extreme positions and an intermediate neutral position, so that the gear can be placed in reverse, first, intermediate and high speed, depending upon which of the four extreme positions is occupied by a bar, said bars being spaced parallel to each other, a shift member having an axis perpendicular to the motion of the bars, and capable, by an axial movement, to be placed in operative position with either of the bars, and by a rocking movement to operate the bar with which it is in operative position, a pivotally mounted member, a releasable connection between said pivotally mounted member and the clutch control mechanism, whereby said pivotally mounted member is adapted to be swung about its pivot in response to movement of said mechanism, and means whereby said movement of the pivotally mounted member is effective to move the shift member axially.

17. In a variable speed mechanism provided with a clutch, clutch control mechanism and variable speed gearing, said gearing having a pair of axially movable shifter bars, each having extreme positions and an intermediate neutral position, so that the gear can be placed in reverse, first, intermediate and high speed, depending upon which of the four extreme positions is occupied by a bar, said bars being spaced parallel to each other, a shift member having an axis perpendicular to the motion of the bar, and capable, by an axial movement, to be placed in operative position with either of the bars, and by a rocking movement to operate the bar with which it is in operative position, and means whereby the force operating the clutch control mechanism is effective for angularly and axially moving the shift member, whereby said member can hold the gearing in neutral or in any one of the speed positions.

18. In a variable speed mechanism provided with a clutch, clutch control mechanism and variable speed gearing, said gearing having a pair of axially movable shifter bars, each having extreme positions and an intermediate neutral position, so that the gear can be placed in reverse, first, intermediate and high speed, depending upon which of the four extreme positions is occupied by a bar, said bars being spaced parallel to each other, a shift member having an axis perpendicular to the motion of the bars, and capable, by an axial movement, to be placed in operative position with either of the bars, and by a rocking movement to operate the bar with which it is in operative position, and means whereby the force operating the clutch control mechanism is effective for angularly and axially moving the shift member, whereby said member can hold the gearing in neutral or in any one of the speed positions, said means including a lost motion connection whereby the clutch is freed before said shift member can be actuated to move a shifter bar.

19. In a variable speed mechanism provided with a clutch mechanism including a clutch pedal and a variable speed gear set, said gear set having at least one axially movable shifter bar having extreme ratio determining positions and an intermediate neutral position, a pivoted shift member adapted to be placed in actuating position with respect to said shifter bar and being adapted to have its angular position about its pivot varied to operate said shifter bar, means to select the position to which said shift member will be moved upon movement of the clutch pedal in clutch disengaging direction, said selection being independent of movement of the clutch pedal, means operated by said clutch pedal upon disengaging the clutch mechanism for placing the shift member in said selected actuating position, and means operated by the clutch pedal for controlling the angular position of the shift member.

20. In combination with a variable speed gear set including at least one axially movable shifter bar having extreme positions and an intermediate neutral position, as well as a housing, a shift member having a crank arm, the offset portion of said member being adjacent the bar, the axis of said member being transverse to, and below, the axis of said bar, said member being supported for axial as well as angular movement about its axis, said member and said bar having cooperating means adapted to engage upon axial movement of the member, whereby angular movement of the member will be effective to shift said bar axially.

21. In a variable speed gear set having one or more axially movable shifter bars, a mechanism for operating said bars, comprising a member having an axis of rotation below the bars and transverse to the motion of the bars, as well as an axial motion along its axis of rotation, means disposed adjacent each end of the member for pivotally supporting said member, said member also having an offset portion spaced from the axis of the member in permanent relationship with respect to the ends of said member, provided with an actuating extension adapted to operate the bars.

22. In a variable speed gear set having one or more axially movable shifter bars, a mechanism for operating said bars, comprising a member having an axis of rotation below the bars and transverse to the motion of the bars, as well as an axial motion along its axis of rotation, means for pivotally supporting said member, said member also having an offset portion spaced from the axis of the member in permanent relationship with respect to the ends of said member, provided with an actuating extension adapted to operate the bars.

23. In a variable speed mechanism provided with a clutch, clutch control mechanism and variable speed gearing, said gearing having a pair of axially movable shifter bars, said bars being spaced parallel to each other and adapted to be moved optionally to perform a step in the operation of varying the gear ratio, a shift member having an axis transverse to the motion of the bars, and capable, by an axial movement, to be placed in operative position with either of the bars, and by another movement, to operate the bar with which it is in operative position, mechanism for predetermining the axial position that the shift member shall occupy, and means mechanically joining the clutch control mechanism and the shift member to transmit force exerted on the control mechanism to the shift member to move said member axially by force exerted on said control mechanism, and in accordance with the predetermination.

24. In a variable speed mechanism provided with a clutch, clutch control mechanism and variable speed gearing, said gearing having a pair of longitudinally movable shifter bars, a shift member having optional positions to engage either bar to operate it, and capable of operative movement, means independent of the motion of the clutch control mechanism, for predetermining the position that said shift member shall occupy, and means mechanically joining the clutch control mechanism and the shift member to transmit force exerted on the clutch control mechanism to the shift member to move said shift member to the predetermined position, said mechanically joining means including a member operated upon initial operation of the clutch control mechanism to exert a force continuously upon the shift member to urge it toward its predetermined position.

25. In a variable speed mechanism provided with a clutch, clutch control mechanism and variable speed gearing, said gearing having a pair of movable shifter bars, a shift member having optional positions to engage either bar to operate it, and capable of operative movement, means independent of the motion of the clutch control mechanism, for predetermining the position that said shift member shall occupy, and means mechanically joining the clutch control mechanism and the shift member to transmit force exerted on the clutch control mechanism to the shift member to cause the shift member to assume either of its optional positions, and then to move the shift member to operate the associated bar, said mechanically joining means including a member operated upon initial operation of the clutch control mechanism to exert a force continuously upon the shift member to urge it toward its predetermined position.

26. In a transmission mechanism the ratio of which is variable and having a clutch for connecting the transmission to a source of power and clutch control mechanism, as well as a pair of shiftable bars capable of being moved in either direction from a neutral position for adjusting the ratio, a shift member, means for operating the shift member to select the bar to be moved thereby, and means for actuating the shift member to move the selected bar, at least one of said means including a mechanical connection between the clutch control mechanism and the shift member, as well as fluid pressure operated control means for selectively setting the mechanical connection so as to cause the clutch control mechanism, upon motion in clutch releasing direction, mechanically to operate said shift member.

27. In a transmission mechanism the ratio of which is variable and having a clutch for connecting the transmission to a source of power and clutch control mechanism, as well as a pair of shiftable bars capable of being moved in either direction from a neutral position for adjusting the ratio, a shift member, means for operating the shift member to select the bar to be moved thereby, and means for actuating the shift member to move the selected bar, at least one of said means including a mechanical connection between the clutch control mechanism and the shift member, as well as electromagnetically operated control means for selectively setting the mechanical connection so as to cause the clutch control mechanism, upon motion in clutch releasing direction, mechanically to operate said shift member.

ALFRED REX HARVEY.